(12) United States Patent
Wu

(10) Patent No.: US 10,679,457 B1
(45) Date of Patent: Jun. 9, 2020

(54) INTELLIGENT LOCKER SYSTEM

(71) Applicant: NATIONAL CHIN-YI UNIVERSITY OF TECHNOLOGY, Taichung (TW)

(72) Inventor: Shih Kuang Wu, Taichung (TW)

(73) Assignee: NATIONAL CHIN-YI UNIVERSITY OF TECHNOLOGY, Taichung (TW)

( * ) Notice: Subject to any disclaimer, the term of this patent is extended or adjusted under 35 U.S.C. 154(b) by 0 days.

(21) Appl. No.: 16/248,136

(22) Filed: Jan. 15, 2019

(51) Int. Cl.
*G07C 9/00* (2020.01)
*G07F 17/12* (2006.01)
*H04B 5/00* (2006.01)
*G06Q 10/06* (2012.01)
*G06F 21/31* (2013.01)

(52) U.S. Cl.
CPC ............ *G07F 17/12* (2013.01); *G06F 21/31* (2013.01); *G06Q 10/0631* (2013.01); *G07C 9/00182* (2013.01); *G07C 9/00571* (2013.01); *H04B 5/0031* (2013.01); *G07C 2009/00769* (2013.01)

(58) Field of Classification Search
None
See application file for complete search history.

(56) References Cited

U.S. PATENT DOCUMENTS

| | | | | |
|---|---|---|---|---|
| 5,946,660 A * | 8/1999 | McCarty | .................. | E05G 1/08 705/5 |
| 6,806,807 B2 * | 10/2004 | Cayne | ................ | G07C 9/00087 340/5.52 |
| 6,999,825 B2 * | 2/2006 | Inomata | .................. | G07F 17/12 340/5.73 |
| 7,176,782 B2 * | 2/2007 | Shitan | ................ | G07C 9/00309 340/5.2 |
| 7,477,132 B2 * | 1/2009 | Mayer | ................ | G07C 9/00142 235/381 |
| 10,096,183 B2 * | 10/2018 | Nitu | .................... | G07C 9/00912 |

* cited by examiner

*Primary Examiner* — K. Wong
(74) *Attorney, Agent, or Firm* — Muncy, Geissler, Olds & Lowe, P.C.

(57) ABSTRACT

An intelligent locker system includes a locker device, a portable electronic device, and a cloud server. The locker device houses an object and is provided with a near-field communication sensing member. When the portable electronic device senses and reads the near-field communication sensing member, a monitor of the portable electronic device displays a deposit position information. Next, the deposit position information is uploaded to the cloud server through the internet. When the user is to retrieve the object, the user is able to use the portable electronic device to display the location of the locker, enhancing the efficiency of locating the locker.

6 Claims, 6 Drawing Sheets

INTELLIGENT LOCKER SYSTEM

BACKGROUND OF THE INVENTION

1. Field of the Invention

The present invention relates to lockers for temporary object depositing, and more particularly, to an intelligent locker system with application of near-field communication.

2. Description of the Related Art

Generally at public places, such as train stations, department stores, or pools, a several lockers are provided for people to temporarily deposit their personal objects. Regarding a conventional locker, to-be-deposited objects are placed into the locker, and the door of the locker is closed and locked up. Next, the user will acquire and keep a key or written password of the corresponding locker. When the user is to retrieve the deposited objects, the key and the password is needed for unlocking the locker.

However, the user easily forget the certain location and position of the locker. Especially for the lockers at train stations or department stores, due to the wide-ranged public space and relatively complicated distribution of floors, the user usually needs to spend a large amount of time for searching the location of the lockers, causing an inconvenience of usage and thus lowering the desire for applying lockers.

Also, during outdoor activities, the user easily loses the key or written password due to negligence or carelessness, such that the locker is unable to be unlocked by the user. As a result, the locker has to be unlocked by service staff, and relative expense will occur upon the user, failing to meet the convenience of usage.

Therefore, it is desirable to develop an improved locker, which is able to guide the user to the certain location of the locker for saving the time needed for searching the locker, so as to increase the application desire of the user.

SUMMARY OF THE INVENTION

For improving the issues above, an intelligent locker system is disclosed, which is able to immediately provide the certain location of where the user deposits the object to the user, thus improving the locker locating efficiency.

For achieving the aforementioned objectives, an intelligent locker system in accordance with an embodiment of the present invention comprises:

a locker device for housing a deposited object, the locker device having a near-field communication sensing member;

a portable electronic device having a near-field communication sensing module, a deposit positioning module, a communication module, and a display module, the deposit positioning module having a positioning unit and a map guidance unit; when the near-field communication sensing module reads and senses the near-field communication sensing member, the positioning unit displays and confirms a deposit position information on the display module, the communication module uploads the deposit position information through an internet, and the map guidance unit displays a plan map which includes the deposit position information; and a cloud server connected with the communication module of the portable electronic device through the internet for receiving and saving the deposit position information.

With such configuration, the present invention mainly applies the near-field communication (NFC) technique for uploading and saving the deposit position information to the cloud server. When the user wishes to retrieve the object, the portable electronic device is applied for downloading the deposit position information from the cloud server, so as to display the information for immediately guiding the user to the certain location of the locker. Therefore, the time needed for the user to locate the locker is saved, thus improving the locker locating efficiency.

DETAILED DESCRIPTION OF THE INVENTION

Figure 1:
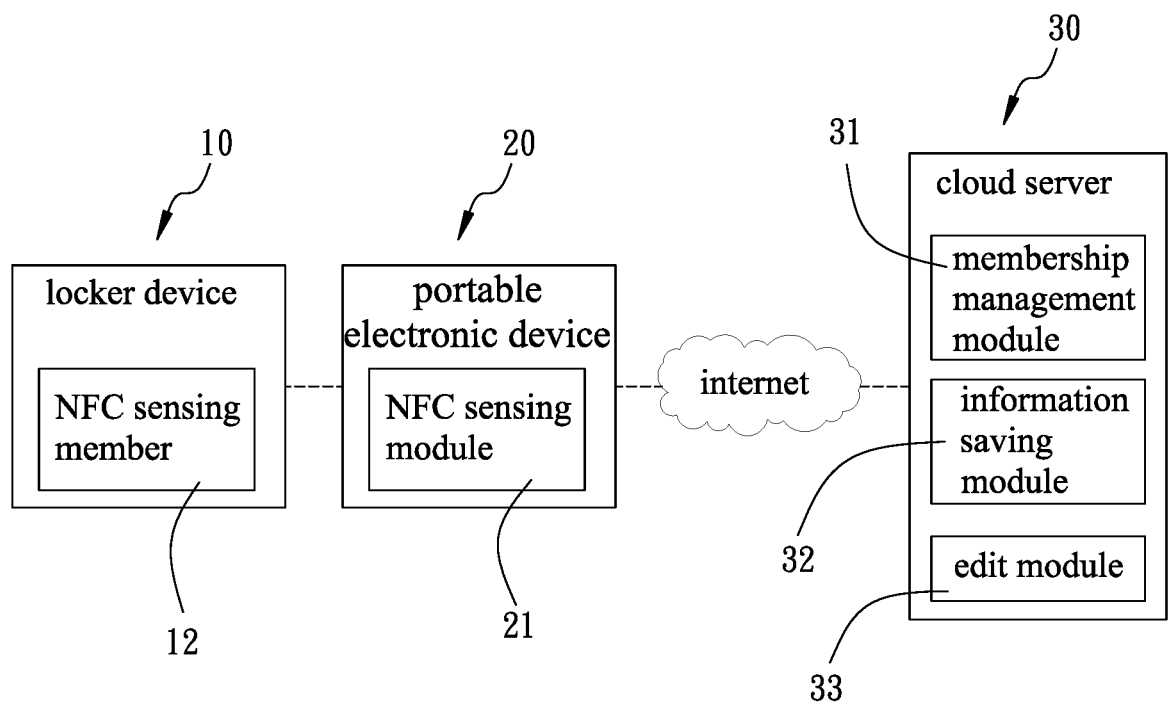
FIG. 1 is a schematic view illustrating the systematic equipment of the locker system in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 6, an intelligent locker system in accordance with an embodiment of the present invention comprises a locker device 10, a portable electronic device 20, and a cloud server 30, wherein the portable electronic device 20 and the cloud server 30 are interconnected through the internet.

The locker device 10 includes a plurality of lockers 11. Each locker 11 is used for housing an objected deposited by a user and able to be locked up. Also, the locker device 10 further comprises a display panel, password input buttons, and a coin slot, such that the user is allowed to pay by inserting coins and inputs a deposit password, thereby controlling the locker 11 housing the object to open.

Also, the locker device 10 comprises a near-field communication sensing member 12 and a signal transmission module 13. The near-field communication sensing member 12 is able to be wirelessly sensed and read by the portable electronic device 20 of the user. The signal transmission module 13 is able to detect the usage status of each locker 11. In an embodiment of the present invention, the usage status includes an occupied status and an available status, and the signal transmission module 13 uploads the usage status of each locker 11 to the cloud server 30 through the internet.

Figure 2:
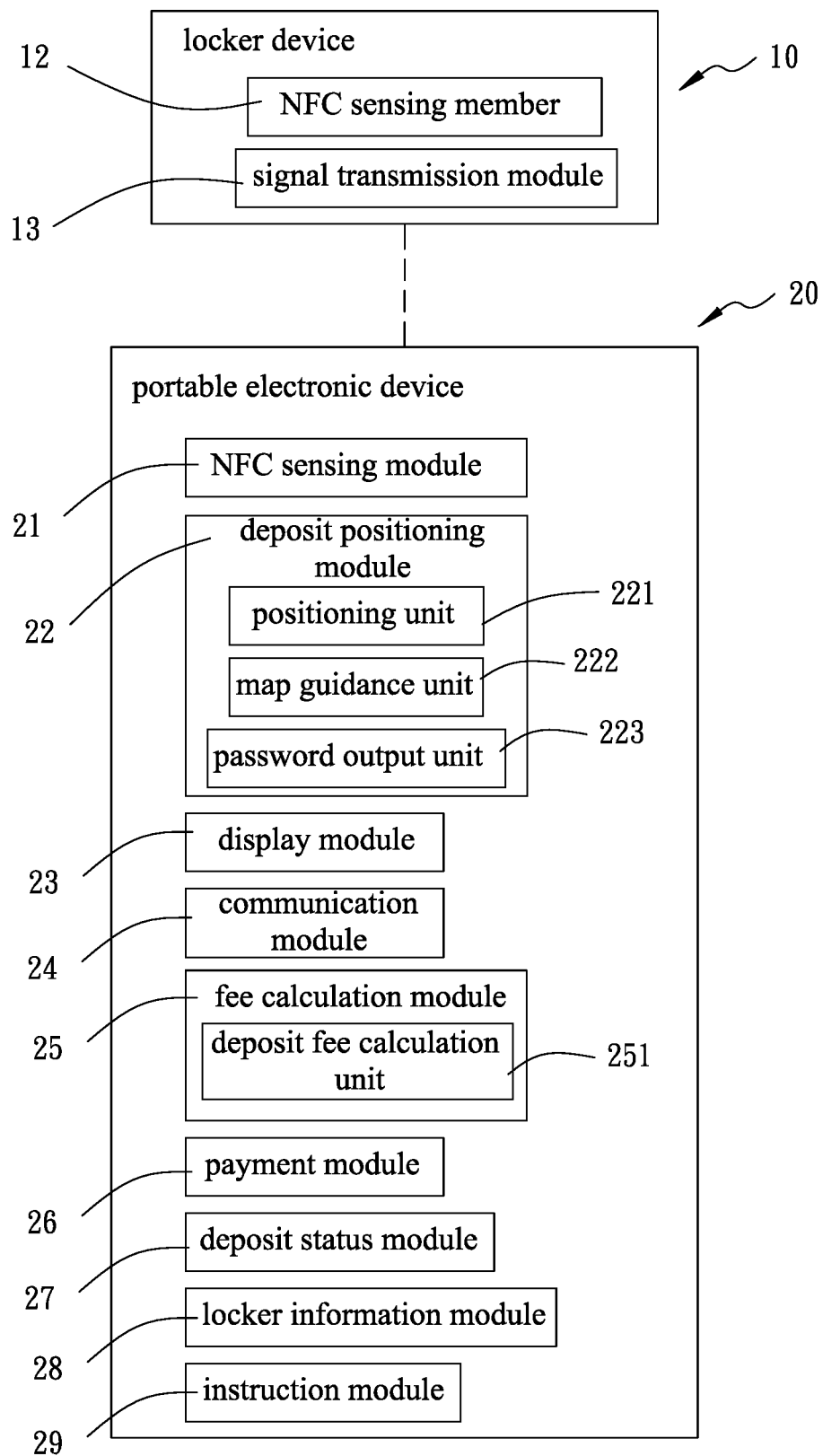
FIG. 2 is a schematic view illustrating the functional structure of the locker system.
Figure 3:
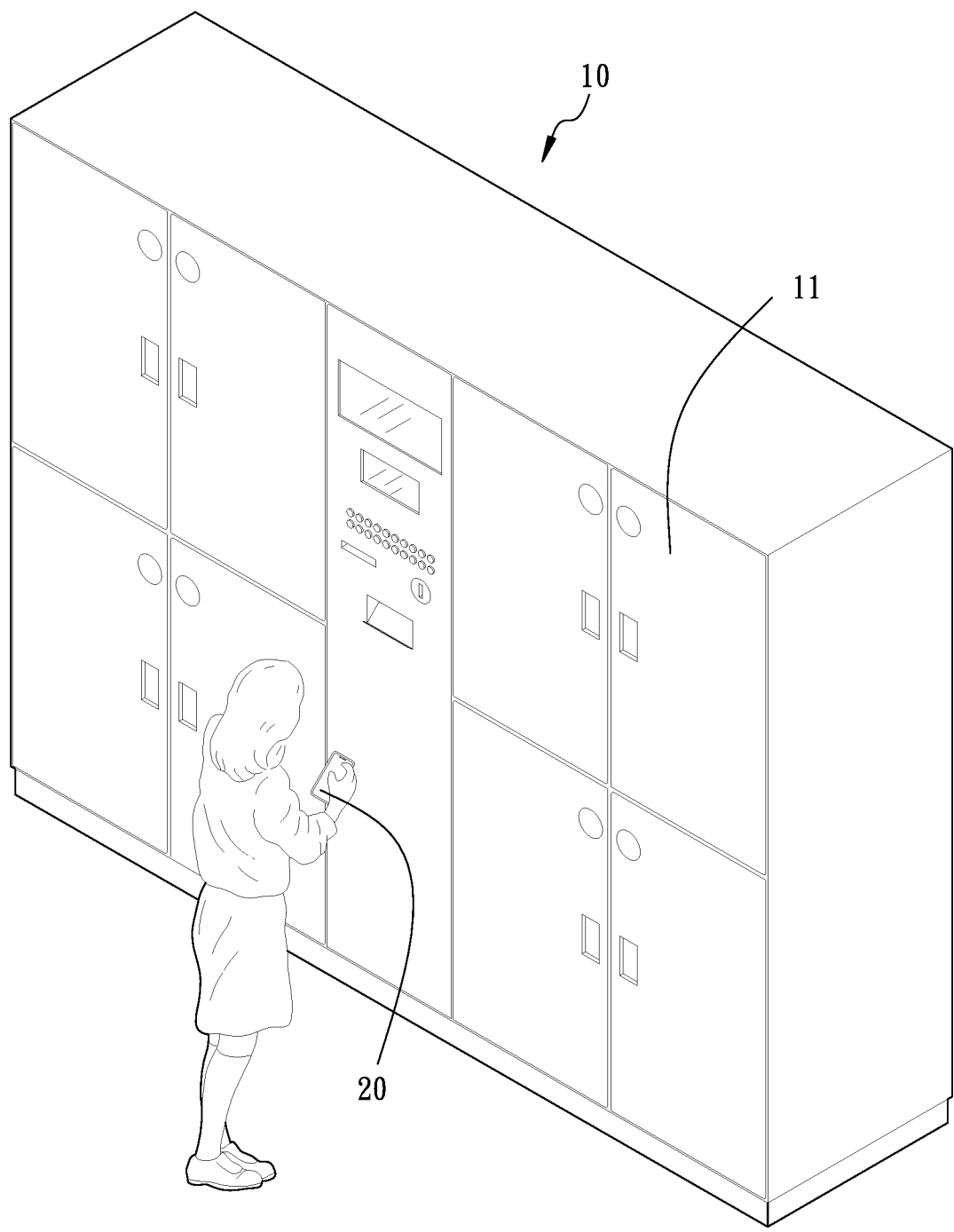
FIG. 3 is a schematic view illustrating the operation of the locker system.
Figure 4:
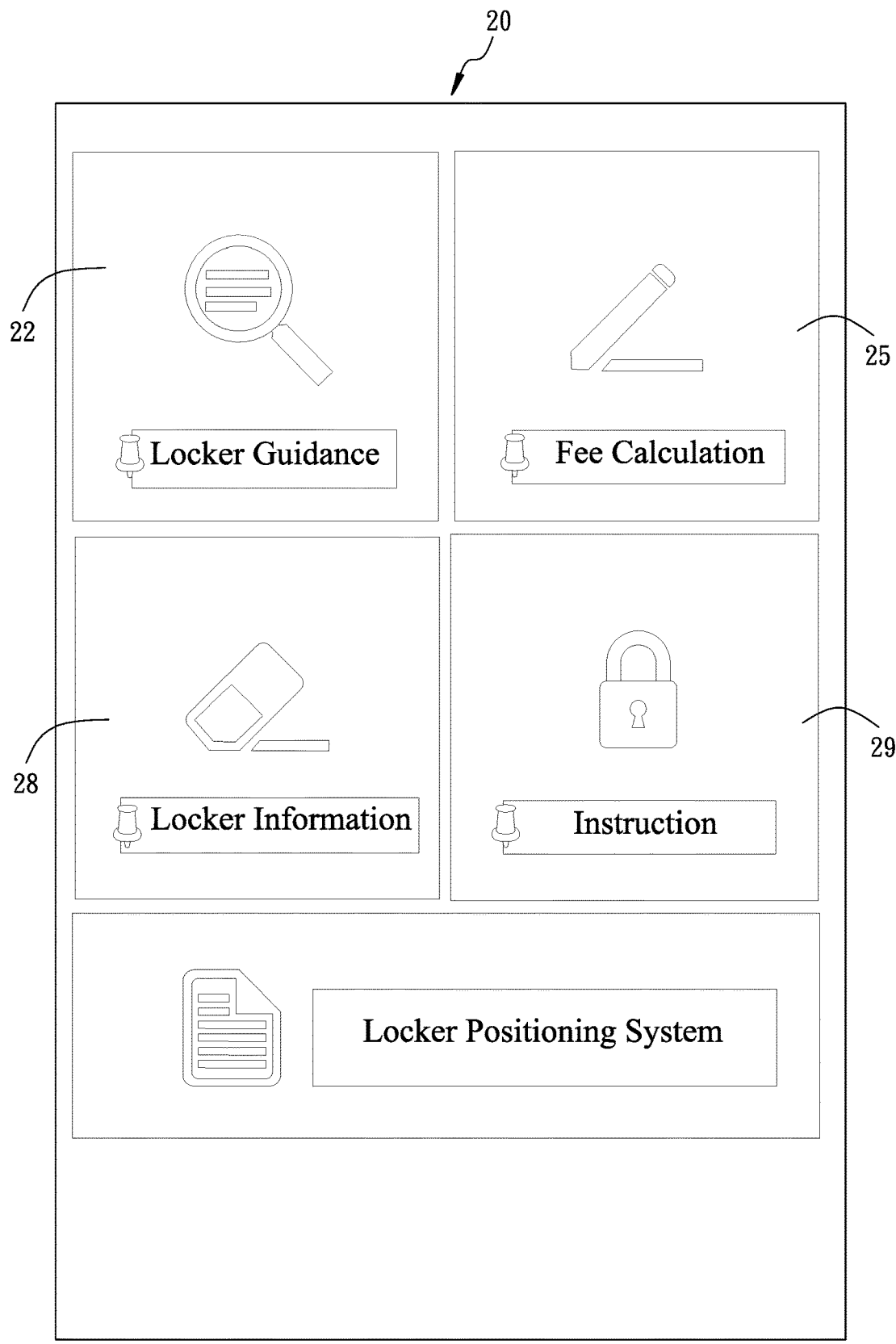
FIG. 4 is a schematic view illustrating the displayed content of the display module in accordance with an embodiment of the present invention.
Figure 5:
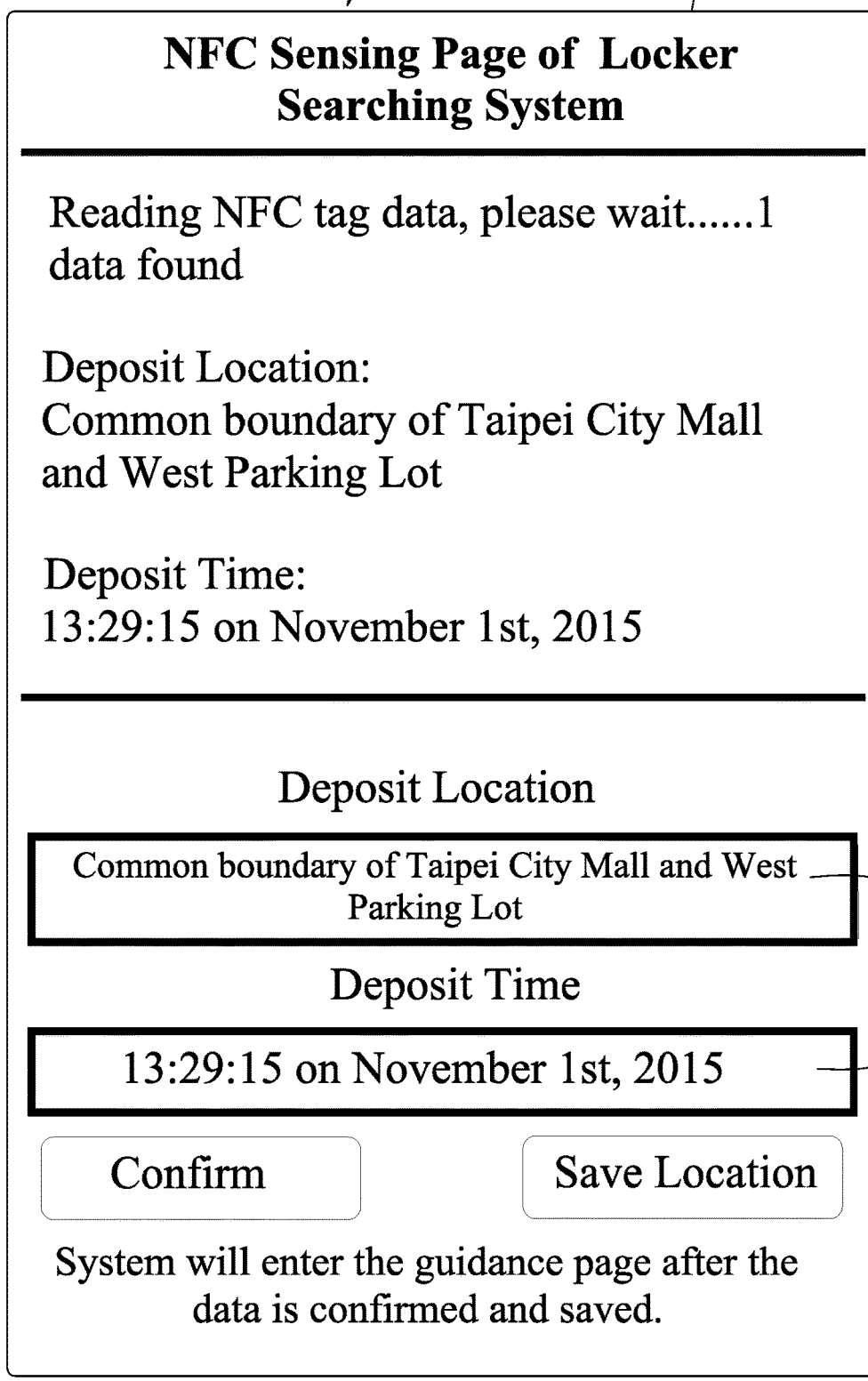
FIG. 5 is a schematic view illustrating the deposit position information displayed by the deposit positioning module in accordance with an embodiment of the present invention.

The portable electronic device 20 is allowed to be, for example but not limited to, a smart phone or tablet computer. In an embodiment of the present invention, the portable electronic device 20 is a smart phone. The portable electronic device 20 comprises a near-field communication sensing module 21, a deposit positioning module 22, a display module 23, and a communication module 24. The near-field communication sensing module 21 senses and reads the near-field communication sensing member 12 of the locker device 10 by use of the near-field communication (NFC) technique. The deposit positioning module 22 comprises a positioning unit 221 and a map guidance unit 222. Referring to FIG. 2 and FIG. 5, when the near-field communication sensing module 21 senses and reads the near-field communication sensing member 12, the positioning unit 221 displays a corresponding deposit position information by the display module 23. In an embodiment of the present invention, the deposit position information includes a deposit location, an initial deposit time, and a route guiding information. Also, the map guidance unit 222 displays a plan map, wherein the plan map integrates the deposit are, initial deposit time, and the route guiding information. The display module 23 is a touch panel of the portable electronic device 20. The communication module 24 uploads the deposit position information to the cloud server 30 through the internet.

The cloud server 30 is connected with the portable electronic device 20 through the internet, so as to receive and save the deposit position information which is uploaded by the communication module 24. The cloud server 30 comprises a membership management module 31, an information saving module 32, and an edit module 33. The membership management module 31 is applied for a user to register for a membership. The information saving module 32 receives the deposit position information uploaded by the portable electronic device 20, and accessible by a user end qualified as a member to view the deposit position information. Also, the information saving module 32 is used for the user to manage the times and efficiency of the usage of the locker device 10. The edit module 33 allows the members to amend or delete the deposit position information.

With such configuration, by use of the portable electronic device 20, the user is able to confirm the certain location and deposit time of the locker device 10 on the cloud server 30, so as to be guided to the correct direction and arrive the location of the locker device 10. Therefore, the time needed for locating the locker device 10 is saved, thus improving the convenience of usage and the efficiency of searching for the locker.

Also, for further improving the convenience and desire of applying the locker device 10, the deposit positioning module 22 further comprising a password output unit 223. When the cloud server 30 receives and saves the deposit position information, the password output unit 223 is able to display the corresponding deposit password through the display module 23, so as to save the cost for issuing a written password and prevent the loss of the password.

Figure 6:
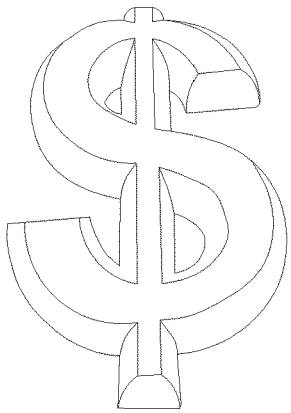
FIG. 6 is a schematic view illustrating the selection of the fee calculation module in accordance with an embodiment of the present invention.

In addition, the portable electronic device 20 further comprises a fee calculation module 25 and a payment module 26. Referring to FIG. 2 and FIG. 6, the fee calculation module 25 presents a rate information of the locker device 10 through the display module 23. Therein, the rate information sets a fee according to the size of the locker 11, and the to-be-charged fee will be added once per three hours based on the fee charging standard. The fee calculation module 25 has a deposit fee calculation unit 251. In an embodiment of the present invention, when the portable electronic device 20 senses and reads the near-field communication sensing member 12 of the locker device 10 again, the deposit positioning module 22 will display a deposit termination time. Meanwhile, the deposit fee calculation unit 251 converts the initial deposit time and the deposit termination time into a deposit duration, and a deposit fee is calculate from the deposit duration according to the fee charging standard of the rate information, wherein the deposit duration is the difference from the initial deposit time to the deposit termination time, in which the deposit termination time is later than the initial deposit time.

The payment module 26 is applied for conducting the payment of the resulted deposit fee. Accordingly the user is able to conduct the payment by a sensing manner, so as to prevent the possibility of not having enough money. Therefore, desire of using the locker device 10 is improved.

Further, the portable electronic device 20 further comprises a deposit status module 27, a locker information module 28, and an instruction module 29. The deposit status module 27 is applied for receiving the usage status signal which is uploaded to the cloud server 30. Therefore, before using the locker device 10, the user is able to confirm if there is any available locker 11.

The locker information module 28 is mainly applied for displaying a usage information of the locker device 10, such as the location and available time of the locker device 10, and the relative information of the specification, size, and forbidden object of each locker 11. The instruction module 29 is applied for displaying an operation information of the deposit positioning module 22. Therefore, the present invention is able to provide relative information of the locker device 10 prior to the usage of the locker device 10, thus further improving the utility of the locker device 10 and application desire of users.

With such configuration, due to the popularity of portable electronic devices 20, the present invention improves the efficiency of locating the locker device 10 by use of portable electronic devices 20. The near-field communication (NFC) technique is applied for uploading the deposit positioning information to the cloud server 30. When the user needs to retrieve the deposited object, the deposit position information is downloaded from the cloud server 30 and displayed through the portable electronic device 20. Therefore, the user is guided toward the correct direction, so as to effectively reach the correct location of the locker device 10. Therefore, the time needed for locating the locker device 10 is saved, and the efficiency of locating the locker device 10 is improved.

Furthermore, when the cloud server 30 finishes saving the deposit position information, the password output unit 223 displays the corresponding deposit password, so as to save the cost for printing the written password and prevent the loss of the password.

Also, the present invention allows the user to pay the fee by sensing manner, thus preventing the inconvenience of the user carrying insufficient money and improving the application desire of the user.

In addition, before applying the locker device 10, the user is able to immediately search and confirm if there is any available locker 11 by use of the portable electronic device 20. Therefore, the user is prevented from making useless effort to reach the locker device 10 in vain, further improving the utility of the locker device 10 and the desire of using the locker device 10.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An intelligent locker system, comprising:
a locker device having a plurality of lockers and a near-field communication sensing member, each of the lockers is lockable and applied for housing a deposited object;
a portable electronic device having a near-field communication sensing module, a deposit positioning module, a communication module, and a display module, the deposit positioning module having a positioning unit, a map guidance unit, and a password output unit; when the near-field communication sensing module reads and senses the near-field communication sensing member, the positioning unit displays and confirms a deposit position information on the display module, the deposit position information includes a deposit location, an initial deposit time, and a route guiding information, the communication module uploads the deposit position information through an internet, and the map guidance unit displays a plan map which comprises the deposit position information; the portable electronic device further has a fee calculation module and a payment module; the fee calculation module displays a rate information of the locker device, and the fee calculation module further includes a deposit fee calculation unit; and
a cloud server connected with the communication module of the portable electronic device through the internet for receiving and saving the deposit position information; after the deposit position information is saved in the cloud server, the password output unit displays a password through the display module, and the password is applied for unlocking the locker; when the near-field communication sensing module senses and reads the near-field communication sensing member again, the deposit positioning module displays a deposit termination time, and the deposit fee calculation unit converts the initial deposit time and the deposit termination time into a deposit duration, such that a deposit fee is calculated from the deposit duration based on the rate information, and the payment module accordingly executes a payment of the deposit fee.

2. The intelligent locker system of claim 1, wherein the deposit duration is a difference from the initial deposit time to the deposit termination time, and the deposit termination time is later than the initial deposit time.

3. The intelligent locker system of claim 1, wherein the locker device comprises a signal transmission module for detecting a usage status of the locker device and uploading the usage status to the cloud server; the portable electronic device further comprises a deposit status module receiving a signal of the usage status from the cloud server.

4. The intelligent locker system of claim 3, wherein the portable electronic device further comprises a locker information module and an instruction module, wherein the locker information module displays a usage information of the locker, and the instruction module displays an operation information of the deposit positioning module.

5. The intelligent locker system of claim 1, wherein the cloud server comprises a membership management module, an information saving module, and an edit module; the membership management module is applied for a user to register for a membership; the information saving module receives and saves the deposit position information of the portable electronic device through the internet; and the edit module is applied for the user owning the corresponding membership to amend or delete the deposit position information.

6. The intelligent locker system of claim 1, wherein the portable electronic device is selected from a group consisting of a smart phone and a tablet computer; the display module is a touch panel of the portable electronic device.

* * * * *